Nov. 7, 1961  B. RANDRUP  3,007,711
YIELDABLE, STABILIZING, BODY SUSPENSION SYSTEM
Filed Jan. 7, 1958  3 Sheets-Sheet 1
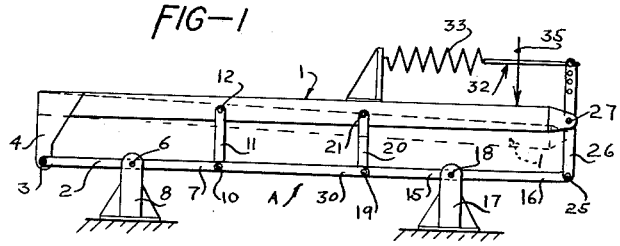
FIG-1
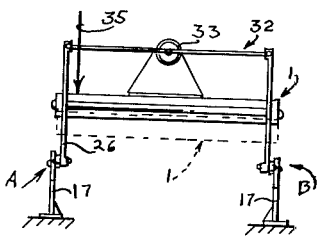
FIG_3
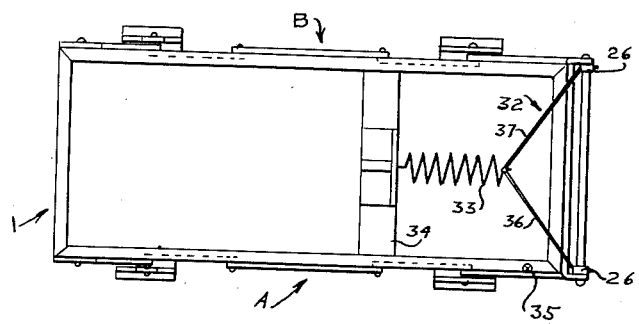
FIG_2
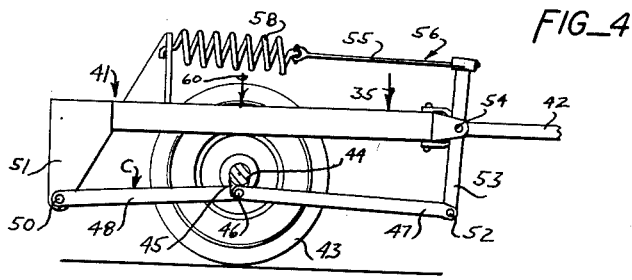
FIG_4
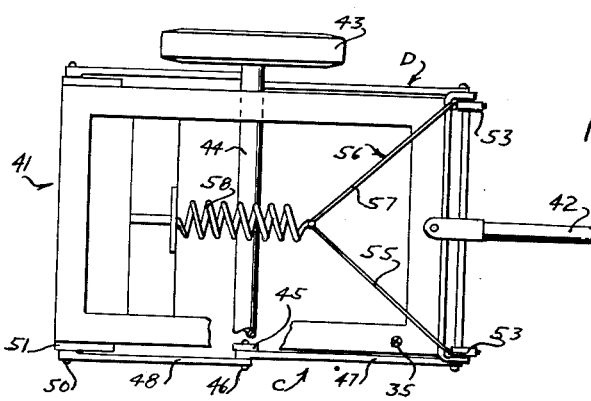
FIG_5
INVENTOR.
BEN RANDRUP
BY
Boyken, Mohler & Wood
ATTORNEYS Nov. 7, 1961  B. RANDRUP  3,007,711
YIELDABLE, STABILIZING, BODY SUSPENSION SYSTEM
Filed Jan. 7, 1958  3 Sheets-Sheet 2
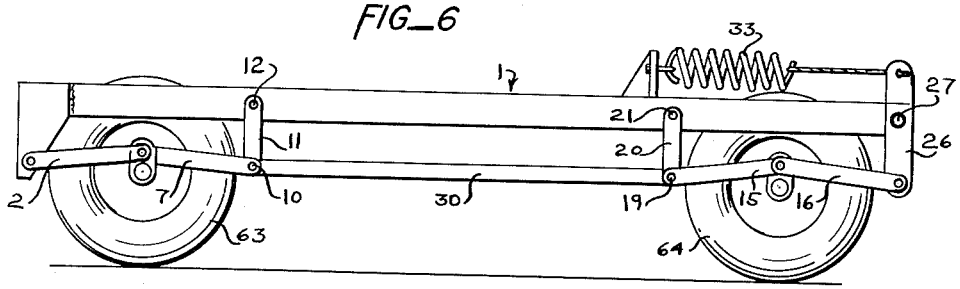
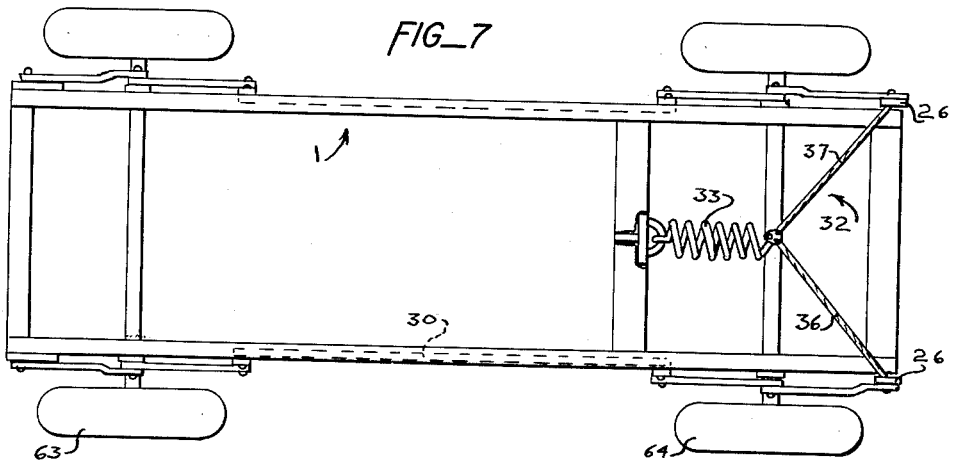
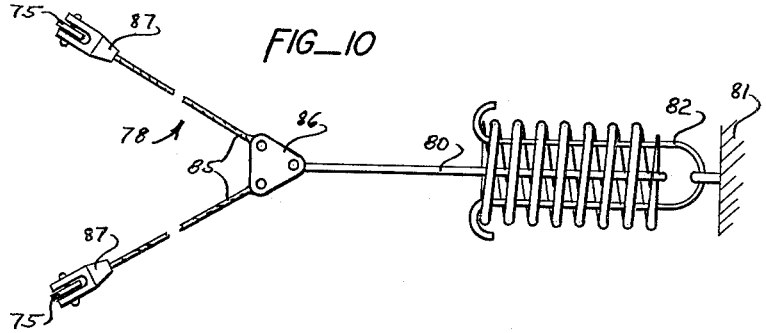
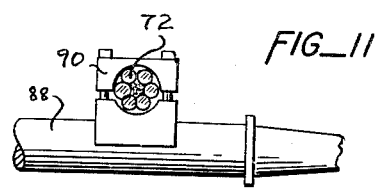
INVENTOR.
BEN RANDRUP
BY
*Boyken, Mohler & Wood*
ATTORNEYS Nov. 7, 1961   B. RANDRUP   3,007,711
YIELDABLE, STABILIZING, BODY SUSPENSION SYSTEM
Filed Jan. 7, 1958   3 Sheets-Sheet 3
FIG_8
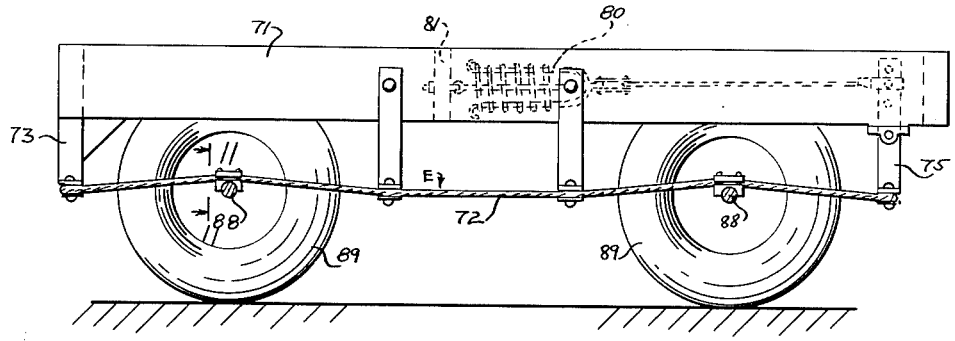
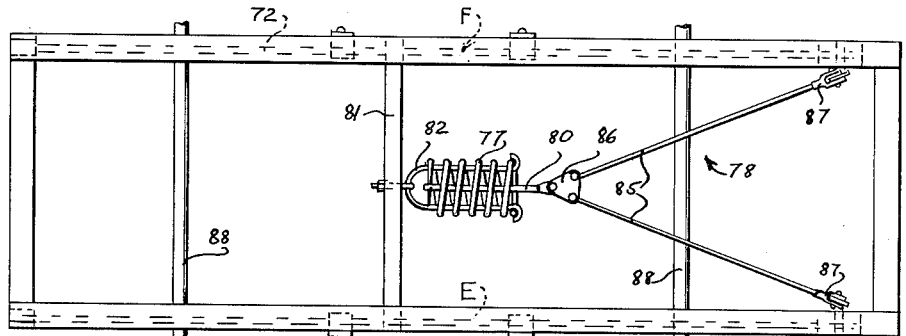
FIG_9
FIG_12
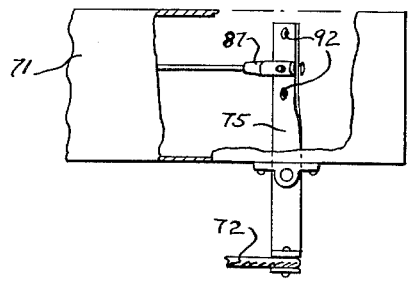
INVENTOR.
BEN RANDRUP
BY
Boyken, Mohler & Wood
ATTORNEYS

United States Patent Office 3,007,711
Patented Nov. 7, 1961

3,007,711
YIELDABLE, STABILIZING, BODY
SUSPENSION SYSTEM
Ben Randrup, 423 Roberta Ave., Pleasant Hill, Calif.
Filed Jan. 7, 1958, Ser. No. 707,555
2 Claims. (Cl. 280—104)

This invention relates to a suspension system which, though particularly lending itself to use on vehicles of various kinds, can be employed for stabilizing any horizontally disposed member or platform which is subject to unequal and unsymmetrical loads and deflections.

The main object of the invention is the provision of an improved suspension system which automatically distributes both the stresses and strains attending unequal loading throughout the member or body to be stabilized to prevent concentration of such stresses or strains at any one point.

Another object of the invention is the provision of a suspension system which effectively absorbs all impacts brought to bear on the supported body by means of one shock absorbing element. For example, when used with a four wheel vehicle such as an automobile on which there are normally employed four shock absorbers, by the present invention only one shock absorbing device is required.

Still another object of the invention is the provision of a suspension system which is adapted to be employed on a horizontally disposed member or body such as the frame of an automobile so that unequal loading on such body does not result in localized deflection of the same but rather permits the body to undergo substantially uniform deflections throughout its entire extent. In other words, when used on an automobile, unequal loading on one side caused either by a static load or by inertia forces when the automobile is making a turn will result in both sides of the automobile undergoing corresponding deflections thus adding to the comfort of the passengers.

Other objects and advantages will be apparent from the attached specification and drawings.

FIG. 1 is a semi-schematic side elevation of a platform showing the invention in use;
FIG. 2 is a plan view of the device of FIG. 1;
FIG. 3 is an end elevation of the device of FIG. 1;
FIG. 4 is a semi-schematic side elevation of a wheeled trailer body showing one embodiment of the invention;
FIG. 5 is a top plan view of the device of FIG. 4;
FIG. 6 is a semi-schematic side elevation of another form of the invention applied to a four wheel vehicle;
FIG. 7 is a top plan view of the device of FIG. 6;
FIG. 8 is a semi-schematic side elevation of another form of the invention as applied to a four wheel vehicle;
FIG. 9 is a top plan view of the device of FIG. 8;
FIG. 10 is an enlarged fragmentary top view of the shock absorbing mechanism of FIGS. 8 and 9.
FIG. 11 is an enlarged fragmentary view showing a method of connecting the axle of the vehicle with a tension member as seen in FIGS. 8 and 9.
FIG. 12 is an enlarged fragmentary view showing a means for adjusting the mechanical advantage of the shock absorbing device.

In detail, a simplified form of the invention is illustrated in FIGS. 1-3 wherein the invention is shown applied to a stationary rectangular body or frame generally designated 1. Disposed under the frame 1 are a pair of spaced horizontally extending tension members generally designated A, B respectively.

The tension members A, B are identical and only one will be described in detail, the same numerals being applied to identical elements of the two tension members. As best seen in FIG. 1, at the rear end of each tension member there is a link 2 provided with a pivot pin 3 for swingably securing the end of link 2 to a bracket 4 which in turn is rigid with body 1. The opposite end of link 2 is swingably secured by means of a pivot pin 6 to the adjacent end of a similar link 7 and also to a support 8 which resists weight of the body 1 and the loads thereon. Tension member B is of course similarly supported.

The end of link 7 that is remote from link 2 is not connected to a fixed pivot as is link 2 but is pivotally secured by means of a pivot pin 10 to the lower end of a hanger bar 11 which in turn is swingably secured at its upper end by means of a pivot pin 12 to the body 1.

The end of each tension member that is remote from the links 2, 7, referred to herein as the forward end, is similarly provided with a pair of elongated substantially horizontally extending links 15, 16 pivotally connected together at their adjacent ends and also pivotally connected to a support 17 by means of a pin 18.

The end of link 15 remote from pivot 18 is also pivotally connected through a pin 19 to the lower end of a hanger bar 20 depending from body 1 and swingably secured thereto at its upper end by means of pivot pin 21.

The distal end of link 16 is swingably connected through a pin 25 to the lower end of a generally vertically extending lever 26 which is swingably connected intermediate its ends by pivot 27 to body 1.

The two opposite ends of the above described tension members are connected by means of a link 30 which is pivotally connected at its ends to links 7 and 15 and hangers 11, 20 by means of the above mentioned pivot pins 10, 19 (FIG. 1).

As best seen in FIG. 2, the upper ends of the levers 26 of the tension members A, B are connected together at the forward end of the body by means of a connector or bridle 32 which in turn is centrally connected to one end of a tension spring 33. Spring 33 may be connected at its other end in any suitable manner to a cross piece 34 integral with body 1. As will subsequently be explained, a compression spring may, with minor modification, be substituted for tension spring 33 or other suitable shock absorbing means may be employed.

It will be understood that some of the links of the tension members A, B may consist of two flat bars instead of one as shown. Obviously no change in operation results from such a modification.

From the above described structure, and referring again to FIG. 1, the weight of the frame 1 including the loads thereon is transferred to supports 8, 17 through tension members A, B in a manner so that the members and the links comprising them are in tension at all times. Although the horizontally extending links are in substantial horizontal alignment the links 2, 7 slant upwardly slightly toward each other because of the upward thrust on pin 6 as indicated in FIG. 1. In like manner, the links 15, 16 slant slightly upwardly toward each other with pivot pin 18 being slightly higher than pins 19, 25.

It will be apparent that the spring 33 resists the total static tensile forces on both tension members A, B and in addition resists any impact loads applied through such members.

The stabilizing effect of the above described suspension system may be readily understood by considering the effect on a horizontally disposed body 1 of a force, indicated by arrow 35, applied to the corner of the body 1 adjacent the lever 26 of tension member A.

Upon application of the load or force 35 as shown, the downward forces on pins 19, 25 exerted by bars 20, 26 respectively tend to cause the almost straight angle between links 15, 16 to decrease thereby increasing the tension in said links and the remainder of the tension member and urging the lever bar 26 to swing in a clockwise direction (FIG. 1). This action of course has the effect of elongating spring 33 and permitting the corresponding lever bar 26 of tension member B to swing in the same manner and in the same direction as the lever bar of member A. The responsive movement of lever bar 26 of member B is not exactly equal to the lever bar 26 of tension member A because of deflection of the various parts under load and also because the greater tension in arm 36 of bridle 32 than in arm 37 will cause the adjacent end of the spring 33 to swing slightly toward side A. The result of this action is that the unloaded side of body 1 is permitted to move downwardly with the loaded side so that no appreciable tilting of body 1 transversely of its length results. In other words, the release of tension in member B permits the links 15, 16 of said member to become disposed at a lesser angle in like manner as the corresponding links in member A.

It should be understood in this connection that because of the proximity of load 35 to the supports 17 the adjacent forward end of frame 1 deflects downwardly but, as indicated by the dotted line deflected position of FIGS. 1, 3 the forward end of the frame remains substantially level in a transverse direction. In other words, upon unsymmetrical application of forces to the frame, the strains experienced by one side of the suspension are duplicated to some extent on the opposite side. It will be understood of course, that the stresses on each side are not equated since it is obvious that the reaction of pin 18 on tension member A of FIG. 1 is much greater, in the example given, than the reaction on the corresponding pin in member B. This result comes about because the tension in leg 36 of bridle 32 is greater than the tension in leg 37 (FIG. 2) although the strain transferred between the members A and B are equal if deformation of the material is disregarded.

A simplified application of the invention is shown applied to a two wheeled vehicle in FIGS. 4, 5 wherein the body or frame 41 of the vehicle is connected at its forward end to a towing tongue 42 and is provided with tension members C, D. In this case, each wheel 43 is rotatable on an axle 44 to which are secured lugs 45. Pivot pins 46 carried by lugs 45 serves to pivotally connect forward and rear links 47, 48 respectively. Rear link 48 is pivotally connected at its opposite end by means of pin 50 to bracket 51 integral with frame 41 and forward link 47 is pivotally connected at its forward end by means of pin 52 to the lower end of vertically extending lever 53. Lever 53 is connected intermediate its ends to frame 41 by pivot pin 54 and at its upper end to one leg 55 of bridle 56 having its opposite leg 57 connected to the corresponding lever 53 on the opposite tension member D. Spring 58 extending between the frame 41 and bridle 56 functions to resist the tension in members C, D and also any impact loads therein.

It will be noted that the tension members C, D of FIGS. 4, 5 are substantially the same in arrangement and operation as tension members A, B, of FIGS. 1, 2 except that only one support is employed in members C, D.

From a consideration of FIG. 4 it will be apparent that an unsymmetrical load indicated by the arrow 35 in FIGS. 4, 5 causes the same type of deflection as the same load in FIGS. 1, 2. In other words, transverse tilting is minimized because the forward end of frame 41 dips in response to the load 35 thereon. The arrangement of FIGS. 4, 5 lends itself particularly to use with small trailers.

It will be understood of course if a load is applied to the frame over the pin 46 such as indicated at 60 in FIG. 4 the entire frame will deflect downwardly to a position parallel to its original position.

Probably the greatest advantage of the present invention when applied to wheeled vehicles resides in the fact a shock impressed at any point on the vehicle is transferred through both tension members as well as being absorbed by the spring means. For example, if it is supposed that the wheel 43 connected to tension member C strikes a bump on the road tending to force said wheel upwardly relative to the frame 41, the tension imparted to tension member C, in addition to being immediately absorbed by spring 58 results in a corresponding strain in member D relaxing the connection at the opposite wheel and permitting the frame on the opposite side to move downwardly. The result is that upon rebound, when the frame tends to fly upwardly, such tendency exists at both sides of the frame and rocking or twisting action is thereby reduced. However, the fact that the absorption of the impact is not localized but is spread throughout both tension members results in rapid dissipation of such impact thereby minimizing the rebound effect and contributing to smooth riding qualities.

Similarly, if wheel 43 of tension member C runs into a ditch in the road, its tendency to fall away from the frame (after the links 47, 48 pass the point at which they are in alignment) also causes increased tension in links 47, 48 so that such falling movement is resisted by spring 58. In addition, the attendant swinging movement of lever 53 of tension member D permits the frame on the opposite side to fall relative to the adjacent wheel thus absorbing the impact created and further resisting the movement of the first wheel into the ditch. It is therefore evident that the shock absorbing qualities of the suspension system are effective regardless of the direction of loading.

FIGS. 6, 7 illustrate the manner in which the embodiment of FIGS. 1, 2 is applied to a four wheel vehicle. The only difference being that wheels 63, 64 are substituted for supports 8, 17.

The only difference in operation between the suspension system described in connection with the two wheeled vehicle of FIGS. 4, 5 and the four wheeled vehicle of FIGS. 6, 7, is that by virtue of the greater number of links and supports employed, the absorption of impact is better in the case of the four wheeled vehicle.

It will be understood that the point of application of loads makes no difference in the operation of the system since loads applied at the rear end of the vehicle are transferred by means of link 30 to the forward end and vice versa. It is obvious that a vehicle having six or more wheels can be fitted with the invention since it is merely necessary to add another pair of substantially aligned links to the additional axle.

Referring again to FIG. 1, and considering the behavior of the system upon application of eccentric load 35 to the forward end of body 1, it is apparent, as a matter of statics, that the rear end of the body 1 tends to move upwardly away from support 8 since load 35 is forwardly of support 17. However, it should be noted, that such upward movement of the body also produces tension in member A just as downward movement of the forward end produces tension. In other words the application of unbalancing forces always produces tension in the tension members regardless of the points of application.

FIGS. 8, 9 illustrate still another embodiment of the invention wherein the frame 71 is supported in the same manner as the body 1 of FIG. 6, except that a wire rope 72 constitutes the tension members E, F instead of the rigid linkages above described. In this case the rope 72 is connected to the rear end of the body 71 through a bracket 73 and at its forward end the rope is connected to the lower end of a vertically extending lever 75 similar to lever 26 of FIG. 1. The upper ends of the levers 75 of the tension members E, F are connected to spring 77 by means of a bridle generally designated 78.

A modified form of spring is shown in FIGS. 8, 9, 10 wherein the bridle 78 is connected by a U-shaped member 80 to the remote end of spring 77 and the cross piece 81 of body 71 is similarly connected by a member 82 to the opposite end of spring 77. In this manner, a compression spring may be employed in lieu of a tension spring in cases where it is advantageous to do so, although the actual operation of the device is not theoretically different.

FIGS. 8, 9, 10, also show a modified form of bridle comprising a pair of legs 85 pin connected at their adjacent ends to a triangular plate 86 which in turn is connected to U-shaped member 80 above described. The spaced ends of the legs 85 are connected by means of clevises 87 to the upstanding levers 75.

The axles 88 of the wheels 89 are connected by means of a bolted fitting 90 to the rope 72 as indicated in FIG. 11 so that the load of the body 71 is transmitted to the wheels through the tension members in the same manner as in the case of the rigid linkage.

It will be understood that various design changes may be made in the embodiments herein described in detail without departing from the spirit of the invention. For example the springs illustrated may be replaced by a shock absorber in which resistance to movement of fluid through an orifice provides the necessary yieldability and resistance to shock. Or an air cylinder could be used for this purpose.

Another obvious variant is to provide a torsion bar in lieu of a spring to absorb the strains imposed by the tension members.

FIG. 12 illustrates a means by which the mechanical advantage of spring 77 may be adjusted. The upper half of the upstanding lever 75 is apertured as at 92 at several points at varying distances from the fulcrum to allow the clevises 87 to be connected to lever 75 so that the proper amount of spring resistance is provided for the load conditions. This of course can be also done to levers 26 and 53 if so desired.

It is obvious many modifications can be resorted to that would not depart from the spirit of this invention or the scope of the following claims.

I claim:

1. A suspension system for a horizontally disposed body subject to unsymmetrical loading comprising: spaced apart, similar, parallel, elongated, horizontally extending tension members pivotally secured at one of their corresponding ends to said body, a pair of links swingably secured to said body and respectively connected to the other corresponding ends of said members, means connecting said links together for movement together in the same direction, and yieldable means associated with said connecting means resisting the tension in said members and for absorbing changes in said tension.

2. A suspension system for a vehicle having a body and a pair of ground wheels comprising: a pair of spaced apart, similar, horizontally elongated tension members secured at one end of their corresponding ends to said body, means intermediate the ends of said members connecting said ground wheels to said members respectively whereby the weight of said body and the loads thereon are transferred through said members to said ground wheels, means at the other corresponding ends of said members connecting the latter together for corresponding movement and means connected with said last mentioned means for resisting the tension in said members and for absorbing loads imposed on said members from said body and wheels.

References Cited in the file of this patent

UNITED STATES PATENTS

| | | |
|---|---|---|
| 1,379,836 | Rackham | May 31, 1921 |
| 2,154,463 | Littman | Apr. 18, 1939 |
| 2,466,833 | Allen | Apr. 12, 1949 |
| 2,565,756 | Coleman | Aug. 28, 1951 |

FOREIGN PATENTS

| | | |
|---|---|---|
| 835,481 | France | Sept. 26, 1938 |
| 9,014 | Great Britain | 1915 |

OTHER REFERENCES

Article in "Autocar," page 277, August 9, 1929.